(12) United States Patent
Li (10) Patent No.: US 12,034,507 B2
(45) Date of Patent: Jul. 9, 2024

(54) METHOD AND DEVICE FOR CHANNEL STATE INDICATION ON UNLICENSED SPECTRUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 317 days.

(21) Appl. No.: 17/625,756

(22) PCT Filed: Jul. 11, 2019

(86) PCT No.: PCT/CN2019/095641
§ 371 (c)(1),
(2) Date: Jan. 9, 2022

(87) PCT Pub. No.: WO2021/003746
PCT Pub. Date: Jan. 14, 2021

(65) Prior Publication Data
US 2022/0278725 A1    Sep. 1, 2022

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0617* (2013.01); *H04L 5/0048* (2013.01);
(Continued)

(58) Field of Classification Search
CPC ..... H04L 47/10; H04L 43/50; H04L 12/2697; H04L 43/0852; H04L 43/00;
(Continued)

(56) References Cited

U.S. PATENT DOCUMENTS

| | | | |
|---|---|---|---|
| 8,774,037 B2 * | 7/2014 | Kim ...................... | H04B 7/0621 370/252 |
| 11,751,088 B2 * | 9/2023 | Bhorkar .............. | H04B 7/0626 370/252 |

(Continued)

FOREIGN PATENT DOCUMENTS

| | | | | |
|---|---|---|---|---|
| CN | 109496457 A | * | 3/2019 | .......... H04W 72/535 |
| CN | 109644454 A | * | 4/2019 | ........ H04W 52/0229 |

(Continued)

OTHER PUBLICATIONS

3GPP TSG RAN WG1#96, Athens, Greece, Feb. 25-Mar. 1, 2019, R1-1901679, Source: vivo, Title: Discussion on wideband operation in NR-U, Agenda Item: 7.2.2.2.5. (Year: 2019).*

(Continued)

*Primary Examiner* — Peter G Solinsky
*Assistant Examiner* — Sanjay K Dewan
(74) *Attorney, Agent, or Firm* — Cozen O'Connor (57) ABSTRACT

A method and device for channel state indication on an unlicensed spectrum. A base station sends channel state indication information through a first antenna panel. The channel state indication information is configured to indicate channel state detection results of k antenna panels of the base station on at least one BWU of an unlicensed spectrum, where k is positive integer.

20 Claims, 3 Drawing Sheets

--- sending, by a base station, channel state indication information through a first antenna panel, wherein the channel state indication information is configured to indicate channel state detection results of k antenna panels of the base station on at least one bandwidth unit BWU of an unlicensed spectrum, where K is a positive integer

201

(51) Int. Cl.
    *H04W 72/04* (2023.01)
    *H04W 72/23* (2023.01)
    *H04W 74/0808* (2024.01)

(52) U.S. Cl.
    CPC ........... *H04L 5/0094* (2013.01); *H04W 72/23* (2023.01); *H04W 74/0808* (2013.01)

(58) Field of Classification Search
    CPC ... H04L 5/0048; H04L 5/0094; H04B 7/0626; H04B 7/0617; H04W 72/23; H04W 74/0808; H04W 72/042
    USPC ........................................................ 370/252
    See application file for complete search history.

(56) References Cited

U.S. PATENT DOCUMENTS

| | | | | |
|---|---|---|---|---|
| 11,765,764 | B2* | 9/2023 | Davydov | H04L 5/0048 370/252 |
| 2012/0147773 | A1* | 6/2012 | Kim | H04L 5/0055 370/252 |
| 2013/0242778 | A1* | 9/2013 | Geirhofer | H04W 24/10 370/252 |
| 2013/0286884 | A1* | 10/2013 | Li | H04L 1/20 370/252 |
| 2014/0133336 | A1* | 5/2014 | Park | H04B 7/0626 370/252 |
| 2015/0172950 | A1* | 6/2015 | Chen | H04L 5/0048 370/252 |
| 2015/0201346 | A1* | 7/2015 | Wu | H04L 5/0048 370/252 |
| 2015/0327106 | A1* | 11/2015 | Lee | H04L 1/0026 370/252 |
| 2016/0056935 | A1* | 2/2016 | Damnjanovic | H04W 72/0446 370/252 |
| 2016/0127936 | A1* | 5/2016 | Chatterjee | H04B 7/0632 370/252 |
| 2019/0020386 | A1* | 1/2019 | Park | H04B 7/04 |
| 2019/0141744 | A1 | 5/2019 | Naghshvar et al. | |
| 2019/0157770 | A1* | 5/2019 | Park | H01Q 3/2605 |
| 2023/0179279 | A1* | 6/2023 | Huang | H04B 7/088 370/252 |

FOREIGN PATENT DOCUMENTS

| | | | | |
|---|---|---|---|---|
| CN | 109804695 | A * | 5/2019 | ........ H04W 72/1273 |
| CN | 109845371 | A * | 6/2019 | .......... H04W 72/046 |
| WO | WO 2014/062029 | A1 * | 4/2014 | ........... H04W 24/00 |
| WO | WO 2018232090 | A1 | 12/2018 | |

OTHER PUBLICATIONS

3GPP TSG RAN WG1 Meeting #94b, Chengdu, China, Oct. 8-12, 2018, R1-1811483, Source: Mitsubishi Electric, Title: Views on multi-panel/TRP MIMO transmission, Agenda Item: 7.2.8.2 Enhancements on Multi-TRP/Panel Transmission. (Year: 2018).*
3GPP TSG RAN WG1 #96, Athens, Greece, Feb. 25-Mar. 1, 2019, Athens, Greece, Feb. 25-Mar. 1, 2019, R1-1902928, Agenda Item: 7.2.2.2.2, Source: Potevio, Title: On Enhancement to Initial Access Procedure for NR-U. (Year: 2019).*
PCT/CN2019/095641 English translation of International Search Report dated Mar. 31, 2020, 2 page.
Japanese Patent Application No. 2022-501033 Notice of Reasons for Refusal dated Apr. 25, 2023, 3 pages.
Japanese Patent Application No. 2022-501033 English Translation of Notice of Reasons for Refusal dated Apr. 25, 2023, 3 pages.
Vivo, "Discussion on wideband operation in NR-U" 3GPP TSG RAN WG1 #96, R1-1901679, Mar. 2019, 7 pages.
Mitsubishi Electric "Views on multi-panel/TRP MIMO transmission" 3GPP TSG RAN WG1 Meeting #94b, R1-1811483, Oct. 2018, 7 pages.
Samsung "Channel access procedures for NR-U" 3GPP TSG RAN WG1 Meeting #94bis, R1-1810860, Oct. 2018, 11 pages.
Potevio "On Enhancement to Initial Access Procedure for NR-U" 3GPP TSG RAN WG1 #96, R1-1902928, Feb. 2019, 7 pages.
Russian Patent Application No. 2022103030, Office Action dated Sep. 20, 2022, 9 pages.
Russian Patent Application No. 2022103030, English translation of Office Action dated Sep. 20, 2022, 7 pages.
Japanese Patent Application No. 2022-501033, Office Action dated Dec. 6, 2022, 3 pages.
Japanese Patent Application No. 2022-501033, English translation of Office Action dated Dec. 6, 2022, 3 pages.
LG Electronics "Wide-band operation for NR-U" 3GPP TSG RAN WG1 #97, R1-1906679, May 2019, 8 pages.
LG Electronics "Discussion on cooperative transmission" 3GPP TSG RAN WG1 Meeting #89, R1-1707603, May 2017, 6 pages.
OPPO "Channel access procedures for NR-U", 3GPP TSG RAN WG1 #96, R1-1901922, Mar. 2019, 7 pages.
European Patent Application No. 19937345.7, Search and Opinion dated Jan. 5, 2023, 11 pages.

* cited by examiner

FIG. 1 sending, by a base station, channel state indication information through a first antenna panel, wherein the channel state indication information is configured to indicate channel state detection results of k antenna panels of the base station on at least one bandwidth unit BWU of an unlicensed spectrum, where K is a positive integer    201

FIG. 2 detecting by a terminal according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer    301 after receiving by the terminal the channel state indication information sent by a first antenna panel of the base station, detecting by the terminal according to a second cycle, a physical downlink control channel PDCCH signaling issued by the first antenna panel    302

METHOD AND DEVICE FOR CHANNEL STATE INDICATION ON UNLICENSED SPECTRUM

CROSS-REFERENCE TO RELATED APPLICATION

This application is the US national phase application of International Application No. PCT/CN2019/095641, filed on Jul. 11, 2019, the entire content of which is incorporated herein by reference for all purposes.

TECHNICAL FIELD

Embodiments of the disclosure relates to the field of communication technologies, and more particularly to a method and an apparatus for channel state indication on an unlicensed spectrum, and a storage medium.

BACKGROUND

With the development of communication technologies, there is a continuous demand for transmission spectrum. The use of unlicensed spectrum has been proposed for communication between a base station and a terminal.

When the base station wants to use a certain frequency band on the unlicensed spectrum to communicate with the terminal, the base station performs the listen before talk (LBT) process first to detect whether the frequency band is idle. If the frequency band is idle, the base station can use it to communicate with the terminal. If the frequency band is not idle, such that it is occupied by other devices, the base station cannot use the frequency band to communicate with the terminal.

In a 5G NR (New Radio) system, in order to improve a spatial diversity gain, the base station can be implemented by multiple antenna panels to communicate with the terminal, and channel state detection results of the multiple antenna panels may not be the same. In this scenario, there is no perfect solution for the base station to provide channel state indication to the terminal.

SUMMARY

According to a first aspect of embodiments of the present disclosure, a method for channel state indication on an unlicensed spectrum is provided, including:

sending, by a base station, channel state indication information through a first antenna panel, wherein the channel state indication information is configured to indicate channel state detection results of k antenna panels of the base station on at least one bandwidth unit BWU of an unlicensed spectrum, where k is a positive integer.

According to a second aspect of embodiments of the present disclosure, a method for channel state indication on an unlicensed spectrum is provided, including:

detecting by a terminal according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer;

after receiving by the terminal the channel state indication information sent by a first antenna panel of the base station, detecting by the terminal according to a second cycle, a physical downlink control channel PDCCH signaling issued by the first antenna panel.

According to a third aspect of embodiments of the present disclosure, an apparatus for channel state indication on an unlicensed spectrum is provided, which is applied to a base station, and includes:

a processor; and a memory, configured to store instructions executable by the processor, wherein the processor is configured to:

send channel state indication information through a first antenna panel, wherein the channel state indication information is configured to indicate channel state detection results of k antenna panels of the base station on at least one bandwidth unit BWU of an unlicensed spectrum, where K is a positive integer.

According to a fourth aspect of embodiments of the present disclosure, an apparatus for channel state indication on an unlicensed spectrum is provided, which is applied to a terminal, and includes:

a processor; and a memory, configured to store instructions executable by the processor, wherein the processor is configured to:

detect according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer;

after receiving the channel state indication information sent by a first antenna panel of the base station, detect according to a second cycle, a physical downlink control channel PDCCH signaling issued by the first antenna panel.

According to a fifth aspect of embodiments of the present disclosure, there is provided a non-transitory computer readable storage medium, stored thereon with a computer program. When the computer program is executed by a processor, the method according to the first aspect is implemented.

According to a sixth aspect of embodiments of the present disclosure, there is provided a non-transitory computer readable storage medium, stored thereon with a computer program. When the computer program is executed by a processor, the method according to the second aspect is implemented.

BRIEF DESCRIPTION OF THE DRAWINGS

The appended drawings herein are incorporated into the specification and form a part of the specification, showing conformity with embodiments of the present disclosure and used together with the specification to explain principles of the present disclosure.

DETAILED DESCRIPTION

Exemplary embodiments will be explained in detail here, and examples are shown in the attached drawings. Where the following description relates to appended drawings, the same numbers in different appended drawings indicate the same or similar elements, unless otherwise indicated. Implementations described in the following exemplary embodiments do not represent all implementations consistent with embodiments of the present disclosure. Rather, they are only examples of devices and methods which are consistent with some aspects of embodiments of the disclosure as detailed in the attached claims.

The network architecture and business scenarios described by embodiments of the present disclosure is to more clearly explain technical solutions of embodiments of the present disclosure, but do not constitute limitation on the technical solutions of embodiments of the disclosure. Those skilled in the art may know that, with the evolution of network architecture and the emergence of new business scenarios, the technical solutions provided by embodiments of the present disclosure is also applicable to similar technical problems.

Figure 1:
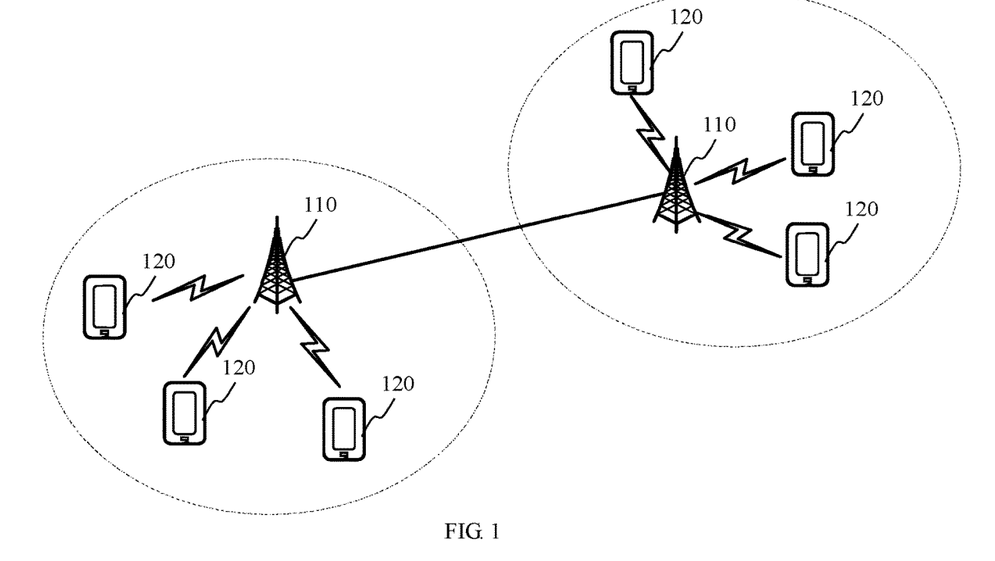
FIG. 1 is a schematic diagram of a network architecture illustrated according to an example embodiment.

FIG. 1 is a schematic diagram of a network architecture illustrated according to an example embodiment. The network architecture may include base stations 110 and terminals 120.

The base station 110 is deployed in an access network. The access network in 5G NR system may be called NG-RAN (New Generation-Radio Access Network). The base station 110 and the terminal 120 communicate with each other through some kind of air interface technology, such as cellular technology.

The base station 110 is a device deployed in an access network to provide wireless communication function for the terminal 120. The base station 110 may include various forms of macro site, micro site, relay station, access point, etc. In systems with different wireless access technologies, the name of the device that functions as a base station may vary, such as gNodeB or gNB in the 5G NR system. As communications technology evolves, the term "base station" may change. For the convenience of description, in embodiments of the present disclosure, the above devices providing wireless communication function for terminals 120 are collectively referred to as base stations. The base station 110 may also be a vehicle-mounted device, which is suitable for vehicle-to-vehicle communication scenarios on the Internet of vehicles. When vehicle-to-vehicle communication occurs, channels or signaling in this disclosure are those suitable for sidelink.

An access network typically provides for multiple terminals 120. One or more terminals 120 may be distributed in a cell managed by each base station 110. Terminals 120 may include various handheld devices with wireless communication capabilities, vehicle-mounted devices, wearable devices, computing devices or other processing devices connected to a wireless modem, as well as various forms of User Equipment (UE), Mobile Station (MS), terminal devices and so on. For convenience of description, in embodiments of the present disclosure, the devices mentioned above are collectively referred to as terminals. The terminal 120 may also be a vehicle-mounted device, which is suitable for vehicle-to-vehicle communication scenarios in the Internet of vehicles. When vehicle-to-vehicle communication occurs, channels or signaling in this disclosure are those applicable for sidelink.

The "5G NR system" in embodiments of the present disclosure may also be referred to as 5G system or NR system, the meaning of which can be understood by those skilled in the art. The technical solutions described in embodiments of the present disclosure may be applied to the 5G NR system, the subsequent evolution system of the 5G NR system and the 5G NR vehicle network system.

Figure 2:
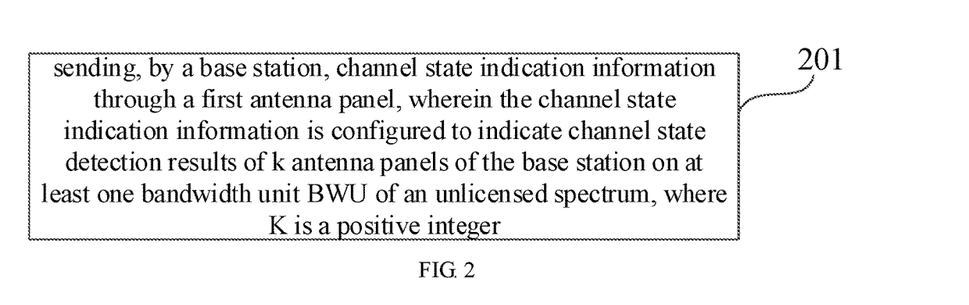
FIG. 2 is a flow chart of a method for channel state indication on an unlicensed spectrum illustrated according to an example embodiment.

FIG. 2 is a flow chart of a method for channel state indication on an unlicensed spectrum illustrated according to an example embodiment. The method may be applied to the base station of the network architecture shown in FIG. 1. The method may include following steps.

In step 201, the base station sends channel state indication information through a first antenna panel, wherein the channel state indication information is configured to indicate channel state detection results of k antenna panels of the base station on at least one BWUs of an unlicensed spectrum, where k is a positive integer.

In 5G NR systems, the base station and the terminals can each have multiple (i.e. two or more) antenna panels in order to improve spatial diversity gain. For example, the base station has multiple antenna panels, which may belong to the same TRP (Transmitter Receiver Point), or may belong to multiple different TRPs. That is, each TRP may include one antenna panel, or may include multiple antenna panels. The base station can communicate with the terminal through multiple antenna panels, for example, send information to the terminal or receive information sent by the terminal.

BWU refers to the bandwidth unit of LBT channel detection. In the unlicensed spectrum, each carrier may contain multiple BWUs, and each BWP may also contain multiple BWUs. Optionally, each BWU may have a respective number and corresponds to a different location on the channel.

For example, the bandwidth on the carrier may be 100 MHz, each BWU is 20 MHz, and the carrier may include 5 BWUs. For example, the bandwidth on the carrier may be 400 MHz, each BWU is 20 MHZ, and the carrier may include 20 BWUs.

It should be noted that each carrier represents one service cell. A base station can provide multiple service cells for the terminal, and in each cell, multiple antenna panels may be used to communicate with the terminal in the cell.

In addition, for any antenna panel, the channel state detection result of the antenna panel on a certain BWU is configured to indicate whether the antenna panel detects that the BWU is idle. The channel state detection results of different antenna panels on the same BWU may be the same or different.

In one possible implementation, the first antenna panel is an antenna panel in a channel occupancy time. That is, the base station can send channel state indication information to the terminal through the antenna panel in the channel occupancy time. The antenna panel in the channel occupation time refers to the antenna panel that is communicating with the terminal, that is, the first antenna panel has detected that the channel is idle and obtained the channel occupation time, and the channel occupation time has not ended. For example, the base station selects an antenna panel as the first antenna panel from the antenna panels in the channel occupation time to send the channel state indication information to the terminal.

In another possible implementation, the first antenna panel is an antenna panel that has detected idle, that is, the first antenna panel is the antenna panel that has just detected the idle, and the base station has not used this antenna panel to send any information to the terminal. In other words, in the following channel occupancy time, the base station can send the channel state indication information to the terminal through the antenna panel that has detected the idle. For example, the base station selects an antenna panel as the first antenna panel from the antenna panels that detect the idle channel(s) to send the channel state indication information to the terminal. In addition, if the first antenna panel is the antenna panel that detects the idle channel(s), the first antenna panel can send the channel state indication information on one or more BWUs detected to be idle.

In an example, the k antenna panels above include the first antenna panel. That is, the channel state indication information sent by the first antenna panel is configured to indicate its own channel state detection results on at least one BWU of the unlicensed spectrum.

In another example, the k antenna panels mentioned above include at least one antenna panel of the base station, other than the first antenna panel, that detect idle channel(s). That is, the channel state indication information sent by the first antenna panel is configured to indicate the channel state detection results of other antenna panels on at least one BWU of the unlicensed spectrum. In this case, channel state indication across antenna panel is realized.

In yet another example, the k antenna panels mentioned above include the first antenna panel and at least one antenna panel other than the first antenna panel that detect idle channel(s). In other words, the channel state indication information sent by the first antenna panel is configured to indicate the channel state detection result of its own on at least one BWU of the unlicensed spectrum, as well as the channel state detection result of other antenna panels on at least one BWU of the unlicensed spectrum. In this case, channel state indication across antenna panels is also realized.

Optionally, when multiple antenna panels detect idle channel(s), the multiple antenna panels send their corresponding channel state indication information respectively. The channel state indication information sent by the i-th antenna panel is configured to indicate the channel state detection results of the i-th antenna panel on at least one BWU of the unlicensed spectrum, where i is a positive integer. That is, for multiple antenna panels that detect idle channel(s), each antenna panel sends the channel state indication information for indicating its own channel state detection results.

In exemplary embodiments, the channel state indication information may be a combination of one or more of the following signals sent by the base station: wake up signal, such as a certain impulse current; synchronization signal block (SSB), such as primary synchronized signal (PSS) or secondary synchronized signal (SSS), and physical broadcast channel (PBCH); discovery signal (DRS); preamble for Wi-Fi (Wireless Fidelity); PDCCH, such as Downlink Control Information (DCI) signaling; DMRS (Demodulation Reference Signal); or some other signal.

In conclusion, in the technical solutions provided by embodiments of the disclosure, the base station sends the channel state indication information through the first antenna panel, which is used to indicate the channel state detection results of at least one antenna panel of the base station on at least one BWU of the unlicensed spectrum. Thus, a channel state indication solution in multi-antenna panel scenario is provided, so that the terminal can obtain the channel state detection results of different antenna panels of the base station on each BWU, which is helpful to realize the reliable transmission between the terminal and the base station.

In addition, when the channel state indication information sent by the first antenna panel is further configured to indicate the channel state detection results of other antenna panels on at least one BWU of the unlicensed spectrum, the channel state indication across antenna panels is realized and the flexibility of channel state indication is improved.

As described in the above embodiments, the first antenna panel may have two cases: 1. the first antenna panel is the antenna panel in the channel occupation time; 2. the first antenna panel is the antenna panel that has just detected the idle.

For the first case above, when there are multiple antenna panels in the channel occupancy time, the first antenna panel is the antenna panel with the longest remaining channel occupancy time and/or the greatest number of BWUs detected to be idle.

In an example, the first antenna panel is the antenna panel with the longest remaining channel occupancy time.

The base station needs to select a set of channel detection parameters when LBT is carried out, including the channel occupancy time, a size of competition window, channel receiving priority and so on. The remaining channel occupation time can be determined based on the channel occupation time and the channel length that has been occupied.

For example, there are three antenna panels in the channel occupancy time, such as panel #1, panel #2 and panel #3. The remaining channel occupation time of panel #1 is 1 ms, the remaining channel occupation time of panel #2 is 3 ms, and the remaining channel occupation time of panel #3 is 2 ms. Therefore, the antenna panel with the longest remaining channel occupation time, namely panel #2, can be selected as the first antenna panel.

In another example, the first antenna panel is the antenna panel that just detected the most idle BWUs.

For multiple antenna panels, if a certain antenna panel detects a greater number of idle BWUs, it indicates that the channel condition around this antenna panel is good, and therefore, the antenna panel can be selected to send information, such as the channel state indication information in embodiments of the present disclosure.

For example, there are three antenna panels in the channel occupancy time, such as panel #1, panel #2 and panel #3. Panel #1 has detected 5 idle BWUs, panel #2 has detected 2 idle BWUs, and panel #3 has detected 1 idle BWU. Then, the antenna panel detecting the most idle BWUs, namely panel #1, can be selected as the first antenna panel.

In yet another example, the first antenna panel is the antenna panel with the longest remaining channel occupancy time and the greatest number of BWUs detected to be idle.

For example, there are three antenna panels in the channel occupancy time, such as panel #1, panel #2 and panel #3. The remaining channel occupation time of panel #1 is 3 ms, the remaining channel occupation time of panel #2 is 3 ms, and the remaining channel occupation time of panel #3 is 1 ms. However, panel #1 detects 5 idle BWUs, panel #2 detects 2 idle BWUs, and panel #3 detects 1 idle BWU. Then, the antenna panel with the longest remaining channel occupancy time and the greatest number of BWUs detected to be idle, namely panel #1, can be selected as the first antenna panel.

In other possible implementations, when there are multiple antenna panels in the channel occupancy time, the base station first selects the antenna panel with the longest remaining channel occupancy time from the multiple antenna panels. If the number of antenna panels with the longest remaining channel occupancy time is 1, this antenna panel is directly identified as the first antenna panel. If the number of antenna panels with the longest remaining channel occupancy time is greater than 1, the antenna panel with the greatest number of BWUs detected to be idle is selected as the first antenna panel from these antenna panels with the longest remaining channel occupancy time. If there are still multiple antenna panels with the greatest number of BWUs detected to be idle among the antenna panels with the longest channel occupancy time, any antenna panel may be selected as the first antenna panel from the antenna panels with the greatest number of BWUs detected to be idle. Alternatively, an antenna panel may be selected as the first antenna panel according to other selection rules, such as selecting the antenna panel with the lightest load as the first antenna panel, etc., which is not limited in embodiments of the disclosure.

Alternatively, when there are multiple antenna panels in the channel occupancy time, the base station first selects the antenna panel with the most BWUs detected to be idle from these antenna panels. If the number of antenna panel with the greatest number of BWUs detected to be idle is 1, this antenna panel is directly identified as the first antenna panel. If the number of antenna panels with the greatest number of BWUs detected to be idle is greater than 1, the antenna panel with the longest remaining channel occupation time is selected as the first antenna panel from those antenna panels with the greatest number of BWUs detected to be idle. If there are still multiple antenna panels with the longest channel occupation time among the antenna panels with the greatest number of BWUs detected to be idle, any antenna panel may be selected as the first antenna panel from the antenna panels with the longest channel occupation time. Alternatively, an antenna panel may be selected as the first antenna panel according to other selection rules, such as selecting the antenna panel with the lightest load as the first antenna panel, etc., which is not limited in embodiments of the disclosure.

For the second case above, when multiple antenna panels detect idle channel(s), the first antenna panel is the antenna panel with the largest occupied time of remaining channels and/or the antenna panel with the most BWUs detected to be idle.

In an example, the first antenna panel is the antenna panel with the longest remaining channel occupancy time.

When multiple antenna panels detect idle channel(s), the channel occupancy time obtained by them may be different due to different channel detection mechanisms and/or channel detection parameters. Some antenna panels obtain a longer channel occupancy time, while others obtain a shorter channel occupancy time. Furthermore, the remaining channel occupancy time of multiple antenna panels may be different.

For example, when 3 antenna panels detect idle channel(s), such as panel #1, panel #2 and panel #3, in which the remaining channel occupation time of panel #1 is 1 ms, the remaining channel occupation time of panel #2 is 3 ms, and the remaining channel occupation time of panel #3 is 2 ms, then the antenna panel with the longest remaining channel occupation time, namely panel #2, can be selected as the first antenna panel.

In another example, the first antenna panel is the antenna panel that detects the most idle BWUs.

For example, when there are 3 antenna panels that detect the idle channel(s), such as panel #1, panel #2 and panel #3, in which panel #1 detects 5 idle BWUs, panel #2 detects 2 idle BWUs, and panel #3 detects 1 idle BWU, then the antenna panel with the most BWUs detected to be idle, namely panel #1, can be selected as the first antenna panel.

In yet another example, the first antenna panel is the antenna panel with the longest remaining channel occupancy and the greatest number of BWUs detected to be idle.

For example, when there are 3 antenna panels that detect idle channel(s), such as panel #1, panel #2 and panel #3, in which, the remaining channel occupation time of panel #1 is 3 ms, the remaining channel occupation time of panel #2 is 3 ms, and the remaining channel occupation time of panel #3 is 1 ms; however, panel #1 detects 5 idle BWUs, panel #2 detects 2 idle BWUs, and panel #3 detects 1 idle BWU, then, the antenna panel with the longest remaining channel occupancy time and the greatest number of BWUs detected to be idle, namely panel #1, can be selected as the first antenna panel.

In other possible implementations, when there are multiple antenna panels that detect idle channel(s), the base station firstly selects the antenna panel with the longest the remaining channel occupation time from these antenna panels. If the number of antenna panels with the longest remaining channel occupancy time is 1, this antenna panel is directly identified as the first antenna panel. If the number of antenna panels with the longest remaining channel occupancy time is greater than 1, the antenna panel with the greatest number of BWUs detected to be idle is selected as the first antenna panel from the antenna panels with the longest remaining channel occupancy time. If there are still multiple antenna panels with the greatest number of BWUs detected to be idle among the antenna panels with the longest remaining channel occupancy time, any antenna panel can be selected as the first antenna panel from the antenna panels with the greatest number of BWUs detected to be idle. Alternatively, an antenna panel can be selected as the first antenna panel according to other selection rules, such as selecting the antenna panel with the lightest load as the first antenna panel, etc., which is not limited in embodiments of the disclosure.

Alternatively, when there are multiple antenna panels that detect the idle channel(s), the base station first selects the antenna panel with the greatest number of BWUs detected to be idle from these antenna panels. If the number of antenna panel with the greatest number of BWUs detected to be idle is 1, this antenna panel is directly identified as the first antenna panel. If the number of antenna panels with the greatest number of BWUs detected to be idle is greater than 1, the antenna panel with the longest remaining channel occupation time is selected as the first antenna panel from those antenna panels with the greatest number of BWUs detected to be idle. If there are still multiple antenna panels with the longest remaining channel occupation time among the antenna panels with the greatest number of BWUs detected to be idle, any antenna panel can be selected as the first antenna panel from the antenna panels with the longest remaining channel occupation time. Alternatively, an antenna panel can be selected as the first antenna panel according to other selection rules, such as selecting the antenna panel with the lightest load as the first antenna panel, etc., which is not limited in embodiments of the disclosure.

Optionally, in the first case above, when there are multiple antenna panels in the channel occupation time, the antenna panel with the longest remaining channel occupation time is preferentially selected as the first antenna panel, and in the second case above, when there are multiple antenna panels that detect idle channel(s), the antenna panel with the greatest number of BWUs detected to be idle is preferentially selected as the first antenna panel.

In conclusion, when selecting the first antenna panel that sends the channel state indication information to the terminal, embodiments of the present disclosure provides a variety of selection methods of the first antenna panel and improves the flexibility of the selection of the first antenna panel.

In an example embodiment, the channel state indication information introduced in the above embodiment in FIG. 1 includes an idle indication signal corresponding to each of the k antenna panels. The idle indication signal corresponding to the i-th antenna panel in the k antenna panels is configured to indicate that the i-th antenna panel detects an idle BWU, where i is a positive integer less than or equal to k. That is, the idle indication signal corresponding to the i-th antenna panel is configured to inform the terminal which BWU or BWUs are detected by the i-th antenna pane to be idle.

In a first possible implementation, the idle indication signal corresponding to the i-th antenna panel includes: a channel state indicator corresponding to each BWU detected by the i-th antenna panel; wherein, the channel state indicator is configured to indicate whether the channel state detection result is idle. Optionally, the channel state indicator is represented by 1 bit, such as "0" for busy and "1" for idle, or "1" for busy and "0" for idle. In addition, respective BWUs detected by the i-th antenna panel may belong to the same carrier, or may belong to multiple different carriers, which is not limited in embodiments of the present disclosure. For example, for a certain carrier with a bandwidth of 100 MHz, which is divided into 5 BWUs, and respective BWUs consist of continuous 20 MHz, the idle indication signal corresponding to the 5 BWUs may be represented by 5 bits. For example, the i-th antenna panel detects the channel state of 10 BWUs in total, then the idle indication signal corresponding to the i-th antenna panel may be represented by 10 bits, and each bit is configured to indicate whether the channel state detection result corresponding to one BWU is idle.

Optionally, the idle indication signal corresponding to the i-th antenna panel further includes at least one of the following: the channel occupancy time of the BWU detected by the i-th antenna panel to be idle; a time-slot format of the BWU detected by the i-th antenna panel to be idle, in the channel occupation time; and a resource allocation of the BWU detected by the i-th antenna panel to be idle, in the channel occupation time. The time-slot format is configured to indicate whether each symbol of each time-slot is used for downlink (D), uplink (U) or to be determined (X). The resource allocation may be used for at least one of PUCCH (Physical Uplink Control Channel), PRACH (Physical Random Access Channel), PDSCH (Physical Downlink Shared Channel), PUSCH (Physical Uplink Shared Channel), and other channels.

In addition, if the idle indication signal sent by the first antenna panel is configured to indicate BWUs detected by itself to be idle, the first antenna panel may send the idle indication signal on one or more of the idle BWUs. The idle indication signal sent by the first antenna panel on a certain idle BWU not only indicates the channel state of the idle BWU, but also indicates the channel state of other BWUs. In addition, assuming that the number of BWUs detected by the first antenna panel to be idle is a (a is a positive integer), the first antenna panel can send the idle indication signal on one of the a BWUs, or send the idle indication signal on multiple BWUs of the a BWUs. For example, the same idle indication signal may be sent on the a BWUs respectively. In this way, after the terminal reads the idle indication signal on one of the BWUs, the terminal obtains the channel state of all BWUs for which the first antenna panel performs channel detection.

In a second possible implementation, the idle indication signal corresponding to the i-th antenna panel includes: idle indication signals respectively sent on each BWU which is detected by the i-th antenna panel to be idle. The idle indication signal sent on the j-th BWU detected by the i-th antenna panel to be idle is configured to indicate that the channel state detection result of the i-th antenna panel on the j-th BWU is idle, where j is a positive integer.

In this case, the idle indication signal on a BWU only indicates that its own channel state is idle, and does not indicate the channel state of other BWUs. For example, the idle indication signal on a certain BWU includes the channel occupation duration of the BWU and the time-slot format of the BWU in the channel occupation time, through which implicitly indicates that the channel state of the BWU is idle. In this way, after the terminal reads the idle indication signal on a BWU, the terminal can learn that the channel state of the BWU is idle, and the terminal also needs to monitor whether there are idle indication signals on other BWUs to obtain the channel state of other BWUs. Alternatively, the idle indication signal on a certain BWU is wake up signal, SSB, etc.

In a third possible implementation, the idle indication signal corresponding to the i-th antenna panel includes BWP switch indication information corresponding to the i-th antenna panel, in which the BWP switch indication information is configured to indicate a target BWP to switch to when the terminal communicates with the i-th antenna panel of the base station. The target BWP includes N BWUs of M BWUs detected by the i-th antenna panel to be idle, where N is less than or equal to M, and both M and N are positive integers.

Optionally, the BWUs contained in the above target BWP may all be BWUs detected to be idle; or the target BWP may also refer to the BWP including the most idle BWUs and the least busy BWUs in all BWPs configured by the base station for the terminal. By switching the BWP to the BWP that contains the most idle BWUs and the least busy BWUs, the PDCCH bandwidth monitoring of the terminal is reduced as much as possible, and the utilization rate of the idle BWUs is also increased.

Optionally, the foregoing BWP switch indication information includes an identifier of the target BWP. The identifier of the target BWP is configured to uniquely identify the target BWP. Different BWPs have different identifiers, and the BWP identifier may be recorded as BWP ID. When the base station configures the BWP for the terminal, it also configures the BWP ID.

In this case, if the terminal receives the BWP switch indication information corresponding to the i-th antenna panel, the terminal considers that the channel state of each BWU included in the target BWP is idle. Even though it is possible that the channel state of individual BWU in the target BWP is busy, the base station does not schedule the RB (Resource Block) on the busy BWU to the terminal. Here, the main reason why the target BWP may include a BWU with a busy channel state is that BWUs with the idle channel state may not be continuous and cannot form a BWP. Therefore, it is necessary to connect the BWUs with the idle channel state through the BWU with the busy channel state to form a BWP.in Optionally, after receiving the BWP switch indication information corresponding to the i-th antenna panel, the terminal switches to the target BWP to communicate with the i-th antenna panel.

The above embodiments introduced three possible implementations of the idle indication signal. The channel state indication information sent by the first antenna panel may include the idle indication signal corresponding to each of the k antenna panels. When k is greater than 1, the k antenna panels may share the same idle indication signal, or the idle indication signals corresponding to the k antenna panels are not shared.

In embodiments of the present disclosure, the base station can indicate the channel state across the antenna panels, so that the antenna panel that transmits the channel state indication information can be flexibly switched. For example, the base station has two antenna panels, denoted as panel #1 and panel #2. Assuming that each antenna panel obtains the same channel occupancy time each time, and panel #1 detects idle channel(s) in advance, if panel #2 detects idle channel(s) when panel #1 is in the channel occupancy time, the base station can send the channel state detection result corresponding to panel #2 through panel #1. This is because when the channel occupancy time obtained by panel #1 starts, the terminal will keep detecting the PDCCH of panel #1, so compared with using panel #2 to send the channel state detection result of panel #2, by directly using panel #1 to send PDCCH to indicate the channel state detection result of panel #2, the terminal only needs to detect the PDCCH sent by panel #1, and there is no need to detect the PDCCH sent by panel #1 and panel #2 at the same time, so that the power consumption of the terminal can be reduced. Since panel #2 occupies a channel later than panel #1, the channel occupancy time of panel #2 has not yet ended when the channel occupancy time of panel #1 ends, and the base station starts to use panel #2 to send PDCCH to the terminal. Panel #1 can check whether the channel is idle again after the channel occupancy time ends. When panel #1 detects that the channel is idle again, if the channel occupancy time of panel #2 has not expired, the base station can send the channel state detection result corresponding to panel #1 through panel #2, and so on. In this way, the terminal can always detect one of the antenna panels within the channel occupation time to obtain the channel state detection results of other antenna panels.

In addition, when the base station has multiple antenna panels that detect idle channel(s), the multiple antenna panels send the PDCCH to the terminal, and the multi-PDCCH mode or the single-PDCCH mode can be adopted. The multi-PDCCH mode means that multiple antenna panels send PDCCHs to the terminal independently, and the single-PDCCH mode means that the PDCCH is sent to the terminal through one antenna panel, and the PDCCH sent by this antenna panel is used to send related information of other antenna panels at the same time.

If the communication between the multiple antenna panels of the base station is not an ideal backhaul line (backhaul), the interactive communication between the multiple antenna panels will have a larger delay. In this case, multiple antenna panels tend to send PDCCHs to the terminal independently to perform PDSCH scheduling independently. That is, the base station uses the multi-PDCCH mode to send the PDCCHs to the terminal. If the communication between the multiple antenna panels of the base station is an ideal backhaul line, there is basically no time delay in the interactive communication between the multiple antenna panels. In this case, the base station tends to use one antenna panel to send the PDCCH to the terminal, and the PDCCH sent by this one antenna panel is used to schedule multiple antenna panels to send downlink data at the same time. That is, the base station uses the single-PDCCH mode to send the PDCCH to the terminal.

In the single-PDCCH mode, the base station can determine a main antenna panel from the multiple antenna panels which are detected to be idle, and then instruct the terminal to subsequently receive only the PDCCH sent by the main antenna panel. The main antenna panel may be the antenna panel with the longest remaining channel occupation time, and the main antenna panel can transmit the PDCCH. Alternatively, the base station and the terminal have a common default time. From this time on, the terminal only monitors the PDCCH sent by the main antenna panel, and the main antenna panel is set using the default method, and the base station does not need to indicate explicitly again.

In addition, regardless of whether the PDCCH is transmitted in the multi-PDCCH mode or the single-PDCCH mode, the PDCCH sent by the base station may be a group-common PDCCH, such as a PDCCH containing the channel state and time-slot format of each BWU. In addition, the group-common PDCCH is sent periodically in the channel occupation time, for example, every several time slots. Optionally, the PDCCH sent by the base station may also include terminal-specific PDCCH resources used for resource scheduling.

In addition, if the base station uses the single-PDCCH mode to send the PDCCH to the terminal, and the PDCCH contains the idle indication signals corresponding to multiple antenna panels, the multiple antenna panels can share the same idle indication signal, or the idle indication signals corresponding to the multiple antenna panels are not shared.

If the multiple antenna panels share the same idle indication signal, each BWU corresponds to a channel state indicator. For example, on each BWU, as long as at least one antenna panel detects idle channel(s), the channel state indicator corresponding to the BWU indicates idle, and only when all antenna panels detect busy on the BWU, the channel state indicator corresponding to the BWU indicates busy. For another example, on each BWU, as long as at least one antenna panel detects busy, the channel state indicator corresponding to the BWU indicates busy, and only when all antenna panels detect idle channel(s) on the BWU, the channel state indicator corresponding to the BWU indicates idle. For example, if the base station has two antenna panels, and the two antenna panels have the same carrier frequency band of 100 MHz, which are divided into 5 BWUs, then the indication may be completed by 5 bits. This method can save the signaling overhead of the idle indication signal, but the premise is that the BWU division of each antenna panel on the carrier is the same, that is, the frequency domain position and bandwidth occupied by each BWU are the same.

If the idle indication signals corresponding to the multiple antenna panels are not shared, each BWU of each antenna panel corresponds to a channel state indicator. For example, if the base station has two antenna panels, and the two antenna panels have the same carrier frequency band of 100 MHz, which are divided into 5 BWUs, then 10 bits are needed to complete the indication. The advantage of this method is that it can accurately indicate the channel state detection result of each antenna panel on each BWU. In addition, even if the BWU divisions of different antenna panels on the carrier are inconsistent, this method can also be used for accurate indication.

Figure 3:
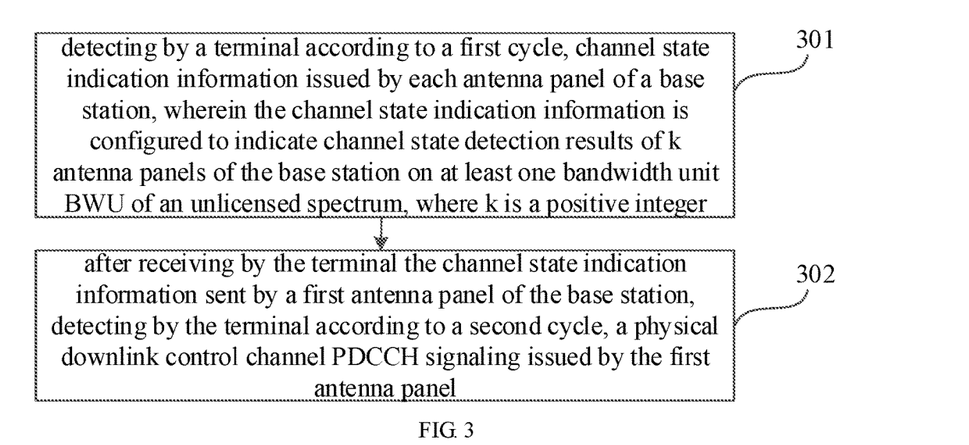
FIG. 3 is a flow chart of a method for channel state indication on an unlicensed spectrum illustrated according to another example embodiment.

FIG. 3 is a flowchart of a method for channel state indication on an unlicensed spectrum illustrated according to another example embodiment. This method can be applied to the terminal 120 of the network architecture shown in FIG. 1. The method may include the following steps.

In step 301, the terminal detects the channel state indication information issued by each antenna panel of the base station according to the first cycle. The channel state indication information is configured to indicate channel state detection results of k antenna panels of the base station on at least one BWU of the unlicensed spectrum, where k is a positive integer.

In the case that the terminal has not detected the channel state indication information issued by any antenna panel of the base station, the terminal periodically detects the channel state indication information issued by each antenna panel of the base station according to the first cycle. The first cycle may be a mini-slot, such as including 1 symbol, 2 symbols, 3 symbols, . . . , 13 symbols, and so on.

In addition, for the introduction and description of the channel state indication information, please refer to the above embodiments, which will not be repeated in this embodiment.

In step 302, after the terminal receives the channel state indication information sent by the first antenna panel of the base station, the terminal detects the PDCCH signaling issued by the first antenna panel according to the second cycle.

After receiving the channel state indication information issued by the first antenna panel, the terminal periodically detects the PDCCH signaling issued by the first antenna panel according to the second cycle. Optionally, the second cycle is greater than or equal to the first cycle. That is, after receiving the channel state indication information issued by the first antenna panel, the terminal monitors the PDCCH signaling sent on the first antenna panel in a larger cycle. This helps to save the power consumption of the terminal.

Optionally, the PDCCH signaling includes: uplink and downlink resources of the first antenna panel scheduled by the base station to the terminal, and/or channel state detection results of other antenna panels except the first antenna panel of the base station. After receiving the channel state indication information issued by the first antenna panel, the terminal continues to monitor the PDCCH signaling sent on the first antenna panel, in order to obtain the above two aspects of information. The base station can use the first antenna panel to indicate the channel state detection results of other antenna panels by means of crossing the antenna panels. The channel state detection results of other antenna panels may also be expressed in the several ways introduced above, which are not limited in embodiments of the present disclosure. Similarly, the channel state detection results of other antenna panels may also include at least one of the following: the channel occupation time of the BWU detected by the other antenna panel to be idle; the time-slot format of the BWU detected by the other antenna panel to be idle, in the channel occupation time; the resource allocation of the BWU detected by the other antenna panel to be idle, in the channel occupation time.

It should be noted that when the channel state indication information is the DMRS sequence of the PDCCH and/or PDCCH, the terminal is equivalent to detecting the PDCCH all the time, but the detection cycles of the two phases before and after may be different. For example, after receiving the PDCCH for indicating the channel state indication information, the detection cycle is increased, and the terminal continue to detect the PDCCH signaling on the antenna panel that has issued the channel state indication information.

In summary, in the technical solutions provided by embodiments of the present disclosure, for a scenario in which a base station has multiple antenna panels, a solution for a terminal to perform PDCCH monitoring is provided. After receiving the channel state indication information issued by a certain antenna panel, the terminal monitors the PDCCH signaling sent on the antenna panel in a larger cycle, which helps to save the power consumption of the terminal.

Figure 4:
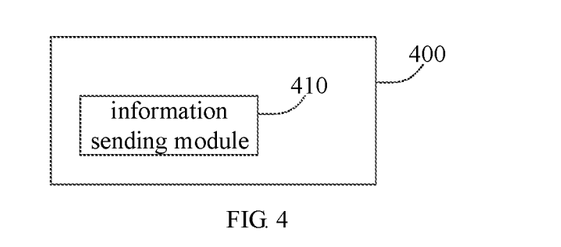
FIG. 4 is a block diagram of an apparatus for channel state indication on an unlicensed spectrum illustrated according to an example embodiment.

FIG. 4 is a block diagram of an apparatus for channel state indication on an unlicensed spectrum illustrated according to an example embodiment. The apparatus has the function of implementing the example of the method on the side of the base station, and the function may be implemented by hardware, or by hardware executing corresponding software. The apparatus may be the base station described above, or may be set in the base station. As shown in FIG. 4, the apparatus 400 may include an information sending module 410.

The information sending module 410 is configured to send channel state indication information through a first antenna panel, wherein the channel state indication information is configured to indicate channel state detection results of k antenna panels of the base station on at least one bandwidth unit BWU of an unlicensed spectrum, where k is a positive integer.

Optionally, the k antenna panels include the first antenna panel.

Optionally, when a plurality of antenna panels detect idle channel(s), the plurality of antenna panels send corresponding channel state indication information respectively;

wherein, the channel state indication information sent by the i-th antenna panel is configured to indicate the channel state detection result of the i-th antenna panel on at least one BWU of the unlicensed spectrum, where i is a positive integer.

Optionally, the k antenna panels include at least one antenna panel of the base station, other than the first antenna panel, that detects idle channel(s).

Optionally, the first antenna panel is an antenna panel that detects idle channel(s).

Optionally, when a plurality of antenna panels detect idle channel(s), the first antenna panel is an antenna panel with the longest remaining channel occupation time and/or the greatest number of BWUs detected to be idle.

Optionally, the first antenna panel is an antenna panel in a channel occupation time.

Optionally, when there are multiple antenna panels in a channel occupation time, the first antenna panel is an antenna panel with the longest remaining channel occupation time and/or the greatest number of BWUs detected to be idle.

Optionally, the channel state indication information includes an idle indication signal corresponding to each of the k antenna panels;

wherein, the idle indication signal corresponding to the i-th antenna panel in the k antenna panels is configured to indicate BWUs detected by the i-th antenna panel to be idle, where i is a positive integer less than or equal to k.

Optionally, the idle indication signal corresponding to the i-th antenna panel includes:

a channel state indicator of each BWU detected by the i-th antenna panel;

wherein, the channel state indicator is configured to indicate whether the channel state detection result is idle.

Optionally, the idle indication signal corresponding to the i-th antenna panel further includes at least one of following: a channel occupancy time of the BWU detected by the i-th antenna panel to be idle; a time-slot format of the BWU detected by the i-th antenna panel to be idle, in the channel occupation time; and a resource allocation of the BWU detected by the i-th antenna panel to be idle, in the channel occupancy time.

Optionally, the idle indication signal corresponding to the i-th antenna panel includes:

an idle indication signal sent on each BWU detected by the i-th antenna panel to be idle;

wherein, the idle indication signal sent on a j-th BWU detected by the i-th antenna panel to be idle is configured to indicate that the channel state detection result of the ith antenna panel on the j-th BWU is idle, where j is a positive integer.

Optionally, the idle indication signal corresponding to the i-th antenna panel includes:

bandwidth part BWP switch indication information corresponding to the i-th antenna panel, wherein the BWP switch indication information is configured to indicate a target BWP to switch to when a terminal communicates with the i-th antenna panel of the base station, and the target BWP comprises N BWUs of M BWUs detected by the i-th antenna panel to be idle, where N is less than or equal to M, M and N are both positive integers.

Optionally, the k antenna panels share a same idle indication signal; or, idle indication signals corresponding to the k antenna panels are not shared.

In conclusion, in the technical solutions provided by embodiments of the present disclosure, the base station transmits the channel state indication information through the first antenna panel, and the channel state indication information is configured to indicate the channel state detection results of at least one antenna panel of the base station on at least one BWU of the unlicensed spectrum. Therefore, a channel state indication solution in a multi-antenna panel scenario is provided, so that the terminal can learn the channel state detection results of different antenna panels of the base station on each BWU, which is helpful to realize reliable transmission between the terminal and the base station.

Figure 5:
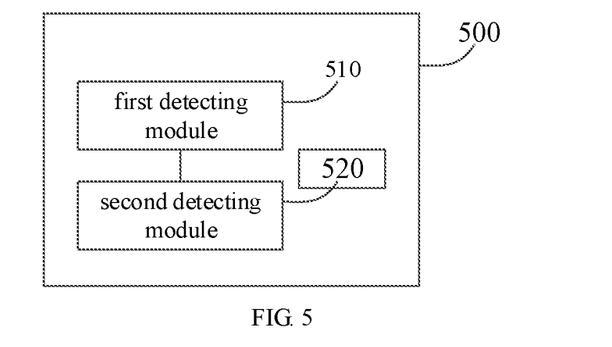
FIG. 5 is a block diagram of an apparatus for channel state indication on an unlicensed spectrum illustrated according to another example embodiment.

FIG. 5 is a block diagram of an apparatus for channel state indication on an unlicensed spectrum illustrated according to another example embodiment. The apparatus has the function of implementing the example of the method on the terminal side described above, and the function may be implemented by hardware, or by hardware executing corresponding software. The apparatus may be the terminal described above, or may be set in the terminal. As shown in FIG. 5, the apparatus 500 may include: a first detecting module 510 and a second detecting module 520.

The first detecting module 510 is configured to detect according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer.

The second detecting module 520 is configured to, after receiving the channel state indication information sent by a first antenna panel of the base station, detect according to a second cycle, a physical downlink control channel PDCCH signaling issued by the first antenna panel.

Optionally, the second cycle is greater than or equal to the first cycle.

Optionally, the PDCCH signaling includes: uplink and downlink resources of the first antenna panel scheduled by the base station to the terminal, and/or channel state detection results of antenna panels other than the first antenna panel of the base station.

In summary, in the technical solutions provided by embodiments of the present disclosure, for a scenario in which a base station has multiple antenna panels, a solution for a terminal to perform PDCCH monitoring is provided. After receiving the channel state indication information issued by a certain antenna panel, the terminal monitors the PDCCH signaling sent on the antenna panel in a larger cycle, which helps to save the power consumption of the terminal.

It should be noted that, when the apparatus provided in the above embodiment implements its functions, the division of the above-mentioned functional modules is used only as an example for illustration. In actual applications, the above-mentioned functions may be allocated to different functional modules according to actual needs. That is, the content structure of the apparatus is divided into different functional modules to complete all or part of the functions described above.

Regarding the apparatus in the foregoing embodiments, the specific manner in which each module performs the operation has been described in detail in the embodiments of the method, and detailed description will not be given here.

An example embodiment of the present disclosure also provides an apparatus for channel state indication on an unlicensed spectrum. The apparatus may be applied to the base station described above, and can implement the method for channel state indication on the unlicensed spectrum on the side of the base station provided by the present disclosure. The apparatus may include a processor, and a memory for storing executable instructions of the processor. The processor is configured to:

send channel state indication information through a first antenna panel, wherein the channel state indication information is configured to indicate channel state detection results of k antenna panels of the base station on at least one bandwidth unit BWU of an unlicensed spectrum, where K is a positive integer.

Optionally, the k antenna panels include the first antenna panel.

Optionally, when a plurality of antenna panels detect idle channel(s), the plurality of antenna panels send corresponding channel state indication information respectively;

wherein, the channel state indication information sent by the i-th antenna panel is configured to indicate the channel state detection result of the i-th antenna panel on at least one BWU of the unlicensed spectrum, where i is a positive integer.

Optionally, the k antenna panels include at least one antenna panel of the base station, other than the first antenna panel, that detects idle channel(s).

Optionally, the first antenna panel is an antenna panel that detects idle channel(s).

Optionally, when a plurality of antenna panels detect idle channel(s), the first antenna panel is an antenna panel with the longest remaining channel occupation time and/or the greatest number of BWUs detected to be idle.

Optionally, the first antenna panel is an antenna panel in a channel occupation time.

Optionally, when there are multiple antenna panels in a channel occupation time, the first antenna panel is an antenna panel with the longest remaining channel occupation time and/or the greatest number of BWUs detected to be idle.

Optionally, the channel state indication information includes an idle indication signal corresponding to each of the k antenna panels;

wherein, the idle indication signal corresponding to the i-th antenna panel in the k antenna panels is configured to indicate BWUs detected by the i-th antenna panel to be idle, where i is a positive integer less than or equal to k.

Optionally, the idle indication signal corresponding to the i-th antenna panel includes:

a channel state indicator of each BWU detected by the i-th antenna panel;

wherein, the channel state indicator is configured to indicate whether the channel state detection result is idle.

Optionally, the idle indication signal corresponding to the i-th antenna panel further includes at least one of following: a channel occupancy time of the BWU detected by the i-th antenna panel to be idle; a time-slot format of the BWU detected by the i-th antenna panel to be idle, in the channel occupation time; and a resource allocation of the BWU detected by the i-th antenna panel to be idle, in the channel occupancy time.

Optionally, the idle indication signal corresponding to the i-th antenna panel includes:

an idle indication signal sent on each BWU detected by the i-th antenna panel to be idle;

wherein, the idle indication signal sent on a j-th BWU detected by the i-th antenna panel to be idle is configured to indicate that the channel state detection result of the ith antenna panel on the j-th BWU is idle, where j is a positive integer.

Optionally, the idle indication signal corresponding to the i-th antenna panel includes:

bandwidth part BWP switch indication information corresponding to the i-th antenna panel, wherein the BWP switch indication information is configured to indicate a target BWP to switch to when a terminal communicates with the i-th antenna panel of the base station, and the target BWP comprises N BWUs of M BWUs detected by the i-th antenna panel to be idle, where N is less than or equal to M, M and N are both positive integers.

Optionally, the k antenna panels share a same idle indication signal; or, idle indication signals corresponding to the k antenna panels are not shared.

An example embodiment of the present disclosure also provides an apparatus for channel state indication on an unlicensed spectrum. The apparatus may be applied to the terminal described above, and can implement the method for channel state indication on the unlicensed spectrum on the side of the terminal provided by the present disclosure. The apparatus may include a processor, and a memory for storing executable instructions of the processor. The processor is configured to:

detect according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer;

after receiving by the terminal the channel state indication information sent by a first antenna panel of the base station, detect according to a second cycle, a physical downlink control channel PDCCH signaling issued by the first antenna panel.

Optionally, the second cycle is greater than or equal to the first cycle.

Optionally, the PDCCH signaling includes: uplink and downlink resources of the first antenna panel scheduled by the base station to the terminal, and/or channel state detection results of antenna panels other than the first antenna panel of the base station.

The foregoing mainly introduces the solutions provided by embodiments of the present disclosure from the perspective of the base station and the terminal. It can be understood that, in order to implement the above-mentioned functions, the base station and the terminal include hardware structures and/or software modules corresponding to respective functions. In combination with the units and algorithm steps of the examples described in the embodiments disclosed in the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 6:
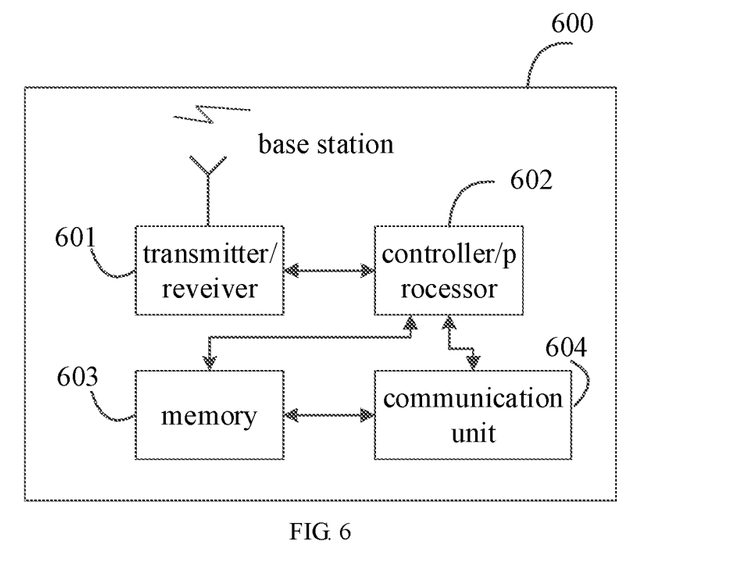
FIG. 6 is a block diagram of a base station illustrated according to an example embodiment.

FIG. 6 is a schematic structural diagram showing a base station according to an example embodiment.

The base station 600 includes a transmitter/receiver 601 and a processor 602. The processor 602 may also be a controller, which is represented as "controller/processor 602" in FIG. 6. The transmitter/receiver 601 is used to support sending and receiving information between the base station and the terminal in the foregoing embodiments, and to support communication between the base station and other network entities. The processor 602 performs various functions for communicating with the terminal. In the uplink, the uplink signal from the terminal is received via the antenna, demodulated by the receiver 601 (for example, the high-frequency signal is demodulated into a baseband signal), and further processed by the processor 602 to restore the service data and signaling information sent by the terminal. On the downlink, service data and signaling messages are processed by the processor 602, and modulated by the transmitter 601 (for example, the baseband signal is modulated into a high-frequency signal) to generate a downlink signal, which is transmitted to the terminal via the antenna. It should be noted that the above-mentioned demodulation or modulation function may also be completed by the processor 602. For example, the processor 602 is further configured to execute various steps on the base station side in the foregoing method embodiments, and/or other steps of the technical solutions described in the embodiments of the present disclosure.

Further, the base station 600 may further include a memory 603, and the memory 603 is used to store program codes and data of the base station 600. In addition, the base station may also include a communication unit 604. The communication unit 604 is used to support the base station to communicate with other network entities (for example, network devices in the core network, etc.). For example, in a 6G NR system, the communication unit 604 may be an NG-U interface to support communication between the base station and a UPF (User Plane Function) entity; or, the communication unit 604 may also be an NG-C Interface, used to support access to AMF (Access and Mobility Management Function) entities for communication.

It can be understood that FIG. 6 only shows a simplified design of the base station 600. In practical applications, the base station 600 may include any number of transmitters, receivers, processors, controllers, memories, communication units, etc., and all base stations that can implement the embodiments of the present disclosure are within the protection scope of the embodiments of the present disclosure.

Figure 7:
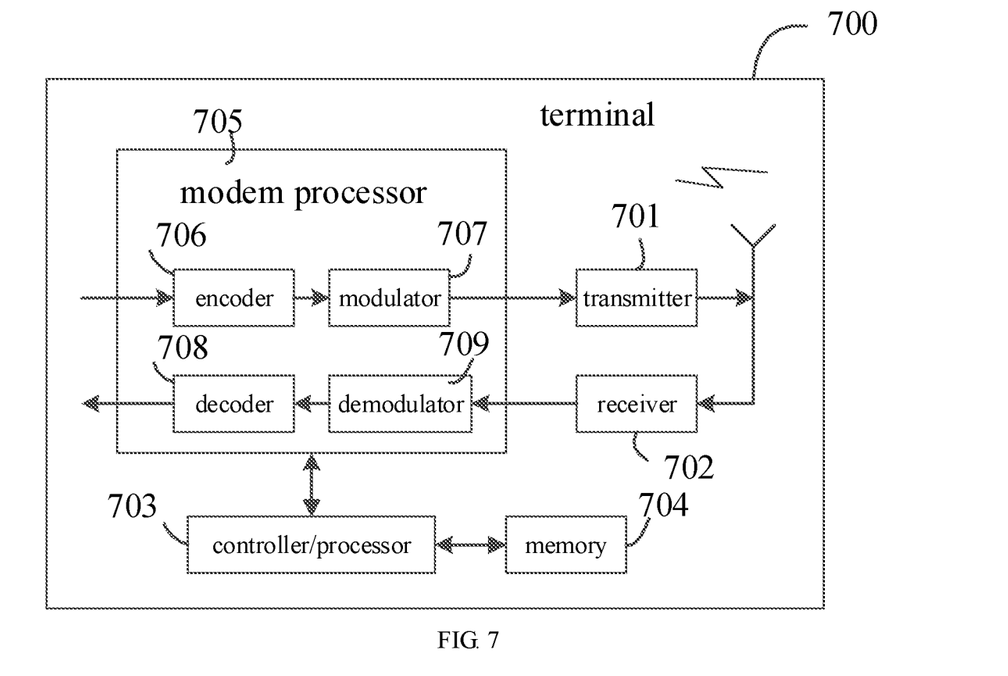
FIG. 7 is a block diagram of a terminal illustrated according to an example embodiment.

FIG. 7 is a schematic structural diagram of a terminal according to an example embodiment.

The terminal 700 includes a transmitter 701, a receiver 702, and a processor 703. The processor 703 may also be a controller, which is represented as "controller/processor 703" in FIG. 7. Optionally, the terminal 700 may further include a modem processor 705, where the modem processor 705 may include an encoder 706, a modulator 707, a decoder 708, and a demodulator 709.

In an example, the transmitter 701 adjusts (e.g., performs analog conversion, filtering, amplification, and upconversion, etc.) the output samples and generates an uplink signal, which is transmitted to the base station via an antenna. On the downlink, the antenna receives the downlink signal transmitted by the base station. The receiver 702 adjusts (e.g., filters, amplifies, down-converts, and digitizes, etc.) the signal received from the antenna and provides input samples. In the modem processor 705, the encoder 706 receives service data and signaling messages to be transmitted on the uplink, and processes the service data and signaling messages (for example, performs formatting, encoding, and interleaving). The modulator 707 further processes (for example, performs symbol mapping and modulation) the encoded service data and signaling messages and provides output samples. The demodulator 709 processes (e.g., demodulates) the input samples and provides symbol estimates. The decoder 708 processes (e.g., de-interleaves and decodes) the symbol estimates and provides decoded data and signaling messages sent to the terminal 700. The encoder 706, the modulator 707, the demodulator 709, and the decoder 708 may be implemented by a synthesized modem processor 705. These units are processed according to the radio access technology adopted by the radio access network (for example, 5G NR and other access technologies of the evolved system). It should be noted that when the terminal 700 does not include the modem processor 705, the foregoing functions of the modem processor 705 may also be performed by the processor 703.

The processor 703 controls and manages the actions of the terminal 700, and is used to execute the processing procedure performed by the terminal 700 in the foregoing embodiments of the present disclosure. For example, the processor 703 is further configured to execute each step on the terminal side in the foregoing method embodiments, and/or other steps of the technical solution described in the embodiments of the present disclosure.

Further, the terminal 700 may further include a memory 704, and the memory 704 is configured to store program codes and data for the terminal 700.

It can be understood that FIG. 7 only shows a simplified design of the terminal 700. In practical applications, the terminal 700 may include any number of transmitters, receivers, processors, modem processors, memories, etc., and all terminals that can implement the embodiments of the present disclosure are within the protection scope of the embodiments of the present disclosure.

Embodiments of the present disclosure also provide a non-transitory computer-readable storage medium on which a computer program is stored. When the computer program is executed by the processor of the base station, the method for channel state indication on the unlicensed spectrum on the base station side is implemented.

Embodiments of the present disclosure also provide a non-transitory computer-readable storage medium on which a computer program is stored. When the computer program is executed by the processor of the terminal, the method for channel state indication on the unlicensed spectrum on the terminal side is implemented.

It should be understood that the "multiple" mentioned herein refers to two or more. "And/or" describes the association relationship of the associated objects, indicating that there may be three types of relationships. For example, A and/or B may mean: A alone exists, A and B exist at the same time, and B exists alone. The character "/" generally indicates that the associated objects before and after are in an "or" relationship.

After considering the specification and practicing the disclosure herein, those skilled in the art will easily think of other examples of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the examples are to be regarded as exemplary only, and the true scope and spirit of the present application are referred to the appended claims.

It should be understood that the present disclosure is not limited to the precise structure described above and shown in the drawings, and various modifications and changes may be made without departing from its scope. The scope of embodiments of the present disclosure is only limited by the appended claims.

What is claimed is:

1. A method for channel state indication on an unlicensed spectrum, comprising:
   sending, by a base station, channel state indication information through a first antenna panel, wherein the channel state indication information is configured to indicate channel state detection results of k antenna panels of the base station on at least one bandwidth unit BWU of an unlicensed spectrum, where k is a positive integer.

2. The method of claim 1, wherein, the k antenna panels comprise the first antenna panel.

3. The method of claim 2, wherein, when a plurality of antenna panels detect idle channel(s), the plurality of antenna panels send corresponding channel state indication information respectively;
   wherein, the channel state indication information sent by the i-th antenna panel is configured to indicate the channel state detection result of the i-th antenna panel on at least one BWU of the unlicensed spectrum, where i is a positive integer.

4. The method of claim 1, wherein, the k antenna panels comprise at least one antenna panel of the base station, other than the first antenna panel, that detects idle channel(s).

5. The method of claim 1, wherein, the first antenna panel is an antenna panel that detects idle channel(s).

6. The method of claim 5, wherein, when a plurality of antenna panels detect idle channel(s), the first antenna panel is an antenna panel with the longest remaining channel occupation time or the greatest number of BWUs detected to be idle.

7. The method of claim 1, wherein, the first antenna panel is an antenna panel in a channel occupation time.

8. The method of claim 7, wherein, when there are multiple antenna panels in a channel occupation time, the first antenna panel is an antenna panel with the longest remaining channel occupation time or the greatest number of BWUs detected to be idle.

9. The method of claim 1, wherein, the channel state indication information comprises an idle indication signal corresponding to each of the k antenna panels;
wherein, the idle indication signal corresponding to the i-th antenna panel in the k antenna panels is configured to indicate BWUs detected by the i-th antenna panel to be idle, where i is a positive integer less than or equal to k.

10. The method of claim 9, wherein, the idle indication signal corresponding to the i-th antenna panel comprises:
a channel state indicator of each BWU detected by the i-th antenna panel;
wherein, the channel state indicator is configured to indicate whether the channel state detection result is idle.

11. The method of claim 9, wherein, the idle indication signal corresponding to the i-th antenna panel further comprises at least one of following: a channel occupancy time of the BWU detected by the i-th antenna panel to be idle; a time-slot format of the BWU detected by the i-th antenna panel to be idle, in the channel occupation time; and a resource allocation of the BWU detected by the i-th antenna panel to be idle, in the channel occupancy time.

12. The method of claim 9, wherein, the idle indication signal corresponding to the i-th antenna panel comprises:
an idle indication signal sent on each BWU detected by the i-th antenna panel to be idle;
wherein, the idle indication signal sent on a j-th BWU detected by the i-th antenna panel to be idle is configured to indicate that the channel state detection result of the ith antenna panel on the j-th BWU is idle, where j is a positive integer.

13. The method of claim 9, wherein, the idle indication signal corresponding to the i-th antenna panel comprises:
bandwidth part BWP switch indication information corresponding to the i-th antenna panel, wherein the BWP switch indication information is configured to indicate a target BWP to switch to when a terminal communicates with the i-th antenna panel of the base station, and the target BWP comprises N BWUs of M BWUs detected by the i-th antenna panel to be idle, where N is less than or equal to M, M and N are both positive integers.

14. The method of claim 9, wherein,
the k antenna panels share a same idle indication signal; or,
idle indication signals corresponding to the k antenna panels are not shared.

15. The method of claim 1, wherein, the channel state indication information comprises an idle indication signal corresponding to at least one antenna panel in the k antenna panels; wherein, the idle indication signal corresponding to the at least one antenna panel is configured to indicate BWUs detected by the at least one antenna panel to be idle.

16. A method for channel state indication on an unlicensed spectrum, comprising:
detecting by a terminal according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer;
after receiving by the terminal the channel state indication information sent by a first antenna panel of the base station, detecting by the terminal according to a second cycle, a physical downlink control channel PDCCH signaling issued by the first antenna panel.

17. The method of claim 16, wherein, the second cycle is greater than or equal to the first cycle.

18. The method of claim 16, wherein, the PDCCH signaling comprises: uplink and downlink resources of the first antenna panel scheduled by the base station to the terminal, and/or channel state detection results of antenna panels other than the first antenna panel of the base station.

19. An apparatus for channel state indication on an unlicensed spectrum, performed by a base station, comprising:
a processor; and
a memory, configured to store instructions executable by the processor,
wherein the processor is configured to implement the method of claim 1 by executing the instructions stored in the memory.

20. An apparatus for channel state indication on an unlicensed spectrum, performed by a terminal, comprising:
a processor; and
a memory, configured to store instructions executable by the processor,
wherein the processor is configured to:
detect according to a first cycle, channel state indication information issued by each antenna panel of a base station, wherein the channel state indication information is configured to indicate channel state detection results of k antenna panels of the base station on at least one bandwidth unit BWU of an unlicensed spectrum, where k is a positive integer;
after receiving the channel state indication information sent by a first antenna panel of the base station, detect according to a second cycle, a physical downlink control channel PDCCH signaling issued by the first antenna panel.

* * * * *